March 19, 1940. C. OLDER Re. 21,403

EXPANSION JOINT FOR CONCRETE PAVEMENTS AND THE LIKE

Original Filed Sept. 26, 1931 3 Sheets-Sheet 1

Inventor:
Clifford Older
By Williams, Bradbury, McCaleb & Hinkle.
Attys.

March 19, 1940. C. OLDER Re. 21,403
EXPANSION JOINT FOR CONCRETE PAVEMENTS AND THE LIKE
Original Filed Sept. 26, 1931 3 Sheets-Sheet 2
Fig. 3.
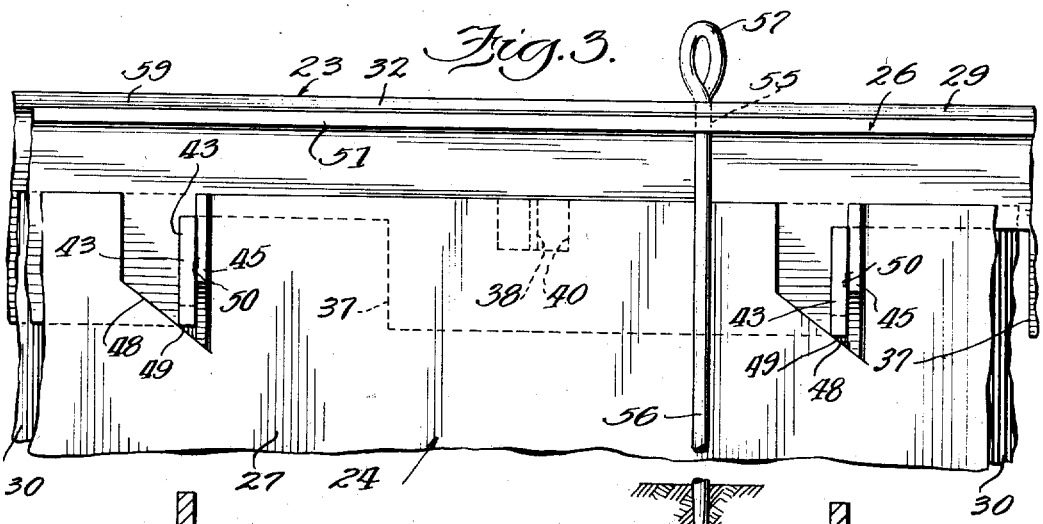
Fig. 4.
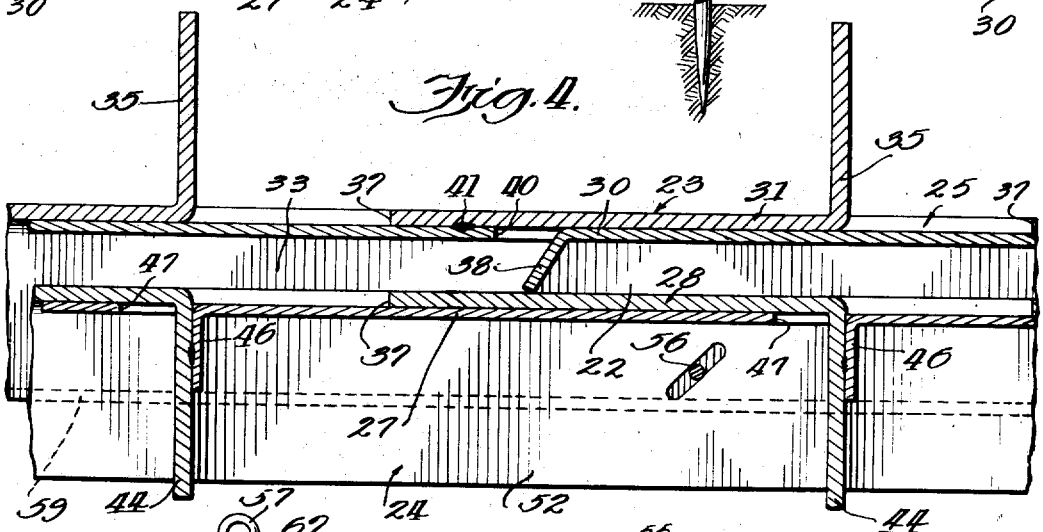
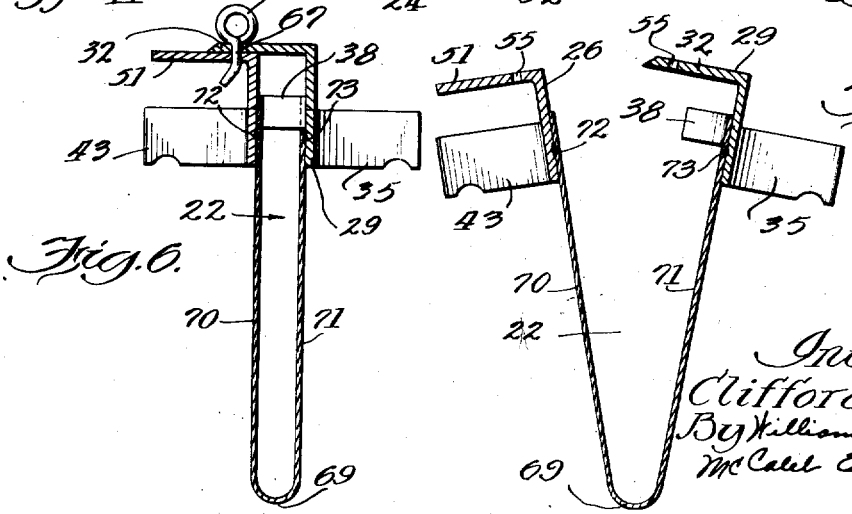
Fig. 6.
Fig. 7.
Inventor:
Clifford Older
By Williams, Bradbury, McCaleb & Hinkle
Attys.

March 19, 1940. C. OLDER Re. 21,403

EXPANSION JOINT FOR CONCRETE PAVEMENTS AND THE LIKE

Original Filed Sept. 26, 1931 3 Sheets-Sheet 3

Inventor:
Clifford Older
By Williams, Bradbury
McCaleb & Hinkle
Attys.

Reissued Mar. 19, 1940

Re. 21,403

UNITED STATES PATENT OFFICE 21,403

EXPANSION JOINT FOR CONCRETE PAVEMENTS AND THE LIKE

Clifford Older, Wilmette, Ill.

Original No. 2,069,898, dated February 9, 1937, Serial No. 565,229, September 26, 1931. Application for reissue February 6, 1939, Serial No. 254,979

13 Claims. (Cl. 94—18)

The present invention relates to expansion joints for concrete pavements and the like, and is particularly concerned with an improved expansion joint which does not require a plastic or semi-plastic filling material.

In the expansion joints of the prior art, the cracks appearing between the sections of pavement are ordinarily filled with a plastic or semi-plastic material, such as asphalt or tar. When such joints close due to the expansion of the adjacent concrete sections, all, or nearly all, of the plastic material is forced out at the top of the joint, since it is prevented from being forced out below the concrete by the presence of the sub-grade material. The plastic material which is forced out at the top of the joint forms, at least temporarily, ridges of material across the pavement, which are struck by the wheels of the passing vehicles, causing an impact blow to fall upon the adjacent concrete slabs. This often causes the slabs to become broken, unless they are made strong enough, at additional expense, to resist this extra force.

Ultimately, the ridges of semi-plastic material may be flattened out by traffic, but in the meantime, the pavement may be seriously damaged. If the plastic filler is soft enough so that it will flatten out immediately under traffic, it will also flow sidewise due to the crown of the pavement and leave the center only partially filled and the surplus flows over the surface of the pavement, forming unsightly pools.

It is also desirable that an expansion joint should permit widening of the joint or crack from its initial position and rewidening from any predetermined position, in order to take care of expansion in the summer and contraction of the concrete pavement sections in the winter. When a joint is filled with such plastic material, it cannot fulfill these functions, because the material which is forced out by the closing of the expansion joint crack is flattened out, and the joint must be refilled with plastic every time it opens, which is a nightly occurrence, if the joint is to be kept free from sand and other material.

One of the objects of the present invention is the provision of an improved expansion joint in which no plastic or compressible filler is required.

Another object is the provision of an improved expansion joint which is capable of permitting either expansion or contraction of the concrete sections, and permitting a substantial widening or closing of the crack or space between the sections without exposing any opening into which soil or other foreign material may enter and interfere with future effective operation of the joint.

Another object is the provision of an improved expansion joint construction, by means of which each section of concrete is supported and reinforced by the adjacent sections so as to eliminate the undue strains which would otherwise be imposed upon the concrete sections at their edges.

Another object is the provision of an improved sliding construction for an expansion joint, which is adapted to automatically maintain itself in clean and operative condition by virtue of its own operation, and which positively precludes the entrance of any dirt or foreign material between the adjacent sections of concrete.

Another object is the provision of an improved expansion joint assembly which is adapted to maintain the adjacent concrete sections in horizontal alignment to eliminate any possibility of one section settling below the other, or producing any bump or irregularity in the pavement at the joint.

Another object is the provision of an improved expansion joint assembly which may be manufactured out of standard structural shapes and plates, or which lends itself readily to manufacture out of sheet metal, so that the metallic members may be manufactured at a low cost.

Another object is the provision of an improved expansion joint assembly which may be installed as a unit in the concrete and supported without the aid of header boards, and which may also be used to end a day's run of concrete, thus entirely eliminating the boards usually employed for that purpose.

Another object is the provision of an improved method of constructing expansion joints by means of which a good bond is assured between the parts of the expansion joint and the concrete section, and the shrinking away of the concrete section from the expansion joint during the drying of the concrete is eliminated.

Other objects and advantages of the invention will appear from the following description, and from the accompanying drawings, in which similar characters of reference indicate similar parts throughout the several views.

Referring to the drawings, of which there are three sheets:

Fig. 3 is a fragmentary, side elevational view of the expansion joint unit taken from the left of Fig. 1;

Fig. 4 is a fragmentary, cross-sectional view taken on the plane of the line 4—4 of Fig. 1;

Fig. 6 is a similar view of another modified form of expansion joint;

Fig. 7 is a similar view of the expansion joint unit of Fig. 6, with the parts in proper position to permit welding operations;

Figure 2:
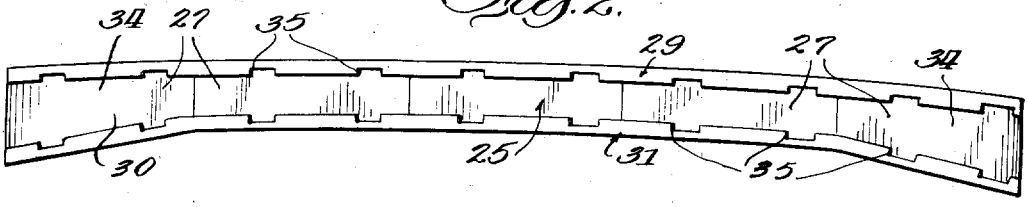
Fig. 2 is a transverse elevational view of one of the expansion joint units, showing one form of contour of the unit for a roadway having a crown and thickened edges.

The embodiment which has been chosen to illustrate the invention, consists of a concrete pavement, such as a roadway, the cross-section of which, transversely to the road, may be substantially as shown in Fig. 2. The present expansion joints may be located as often as desired, depending upon the amount of expansion expected, or upon the termination of a day's work.

Figure 1:
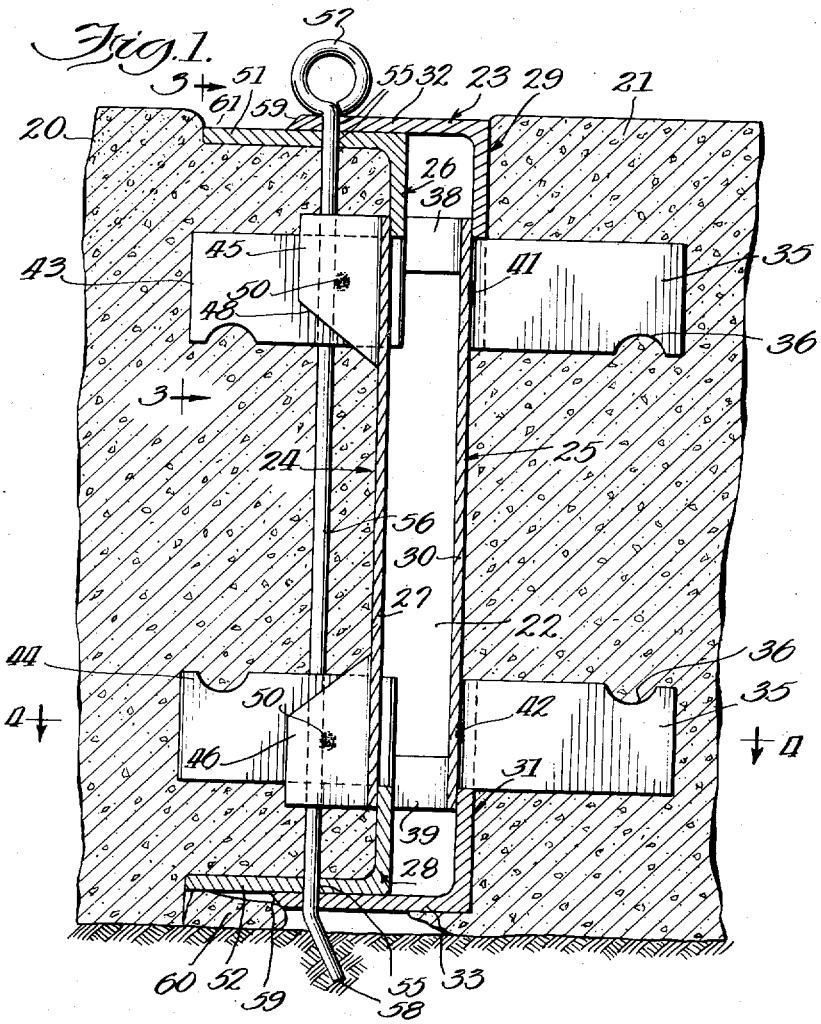
Fig. 1 is a fragmentary, transverse sectional view through an expansion joint constructed according to the present invention. In a concrete pavement, for example, the section of Fig. 1 would be taken longitudinally of the road.

Referring to Fig. 1, the numerals 20, 21 indicate the adjacent ends of two sections of concrete, which are separated by a space 22, and provided with an expansion joint unit indicated in its entirety by the numeral 23. The expansion joint unit 23 preferably consists of a pair of fittings, each indicated in its entirety by the numerals 24 and 25, the fitting 24 being fixedly mounted on the concrete section 20, and the fitting 25 fixedly mounted on the concrete section 21. The fittings 24 and 25 furthermore enclose the space 22 between the concrete sections 20 and 21, and the fitting 24 is slidably mounted in the fitting 25 in order to permit either expansion or contraction of the concrete sections.

Both fittings are preferably built up of standard angle iron members and metal plates in order to construct the devices most economically, and to provide for the closing of apertures which are left, by striking out anchoring formations and attaching flanges. In some embodiments of the invention, however, the fittings 24 and 25 may be constructed of sheet metal, such as steel, which is stamped or bent to the configuration shown in Fig. 1. The angle irons are preferably made of rust-resisting or stainless steel, so as to eliminate any possibility of the joints sticking or becoming rusted together.

Each of the fittings 24 and 25 may thus be built up of a pair of angle irons and a centrally located plate, such as the members 26—28, and the members 29—31. The fitting 24 is similar in construction to the fitting 25, except that fitting 24 is smaller in size and has its parts extending in the reverse direction, and it is adapted to be received between the flanges 32, 33 of the fitting 25. The fitting 25 is preferably provided with a plate 30 of sufficient width so that the fitting is of substantially the same size as the depth of the concrete at any point.

Thus, the unit may be provided with wider portions 34 at each end as shown in Fig. 2, so as to correspond to the depth of the concrete road in that type of construction. If desired, a number of different sections of the plate 27 may be utilized so as to eliminate the necessity for the waste of material involved in forming an irregular section with a crown as shown in Fig. 2 of a single plate of metal.

The angle iron 29 may be substantially similar in construction to angle iron 31, and therefore it is only necessary to describe one of these members.

These angle irons are preferably provided with anchoring lugs 35, which are struck out of the body of the angle irons 29, 31, and extend in a direction opposite to the flanges 32, 33. The anchoring lug 35 may be provided with heads or any irregular formation to anchor them more firmly in the concrete section 21, and one mode of providing an anchoring formation is to form a notch or depression 36 in each lug so that the lugs can not be withdrawn from the concrete after it has hardened.

The plate 30 is preferably wide enough so that it covers the apertures 37 left in the angle iron by the formation of the lugs 35, thus eliminating any possibility of the concrete running into the space 22.

In order to assure the separation of the fittings 24 and 25 so as to maintain the space 22 while the concrete is setting, the plate 30 is preferably provided with a plurality of resilient lugs 38, 39 struck out of the body of the plate adjacent its upper and lower edges, and adapted to engage the opposite angle irons 26, 28. The apertures 40 left by the striking out of the lugs 38, 39 are so located that they are covered by the bodies of the angle irons 29, 31. The plate 30 is secured to the upper angle iron 29 by a plurality of spot welds 41 and to the lower angle iron 31 by a plurality of spot welds 42.

The fitting 24 is formed by the angle iron 26, plate 27 and angle iron 28. The angle irons 26 and 28 are likewise provided with anchoring lugs 43, 44 struck out of the bodies of the angle irons and extending into the concrete section 20. The plate 27 is preferably provided with attaching flanges 45, 46 struck out of the body of the plate adjacent its upper and its lower edge, and adapted to engage the sides of the anchoring lugs 43, 44.

The apertures 47 left by the formation of the attaching flanges 45, 46 are closed by the body of the angle iron, since the attaching flange 46 is struck out of the plate 27 in the manner illustrated in Fig. 4. It will be observed that when the flange 46 and lug 44 are arranged as shown in Fig. 4, there are no apertures in the fitting 24 through which soft concrete might enter the space 22.

Referring now to Fig. 3, it will be noted that the attaching flanges 45 and 46 have been formed with a diagonal cut 48 which brings the edge of the plate 27 in the cut 48 above the lower edge of the angle iron 26. The only possible aperture with such a formation would be a slight triangular aperture 49 below the lug 43, and if desired, or considered necessary, that aperture might also be closed; but it would undoubtedly be negligible in size. Each lug 43 may be spot welded to an attaching flange 45 by a spot weld 50 located outside of the space 22, and this enables the unit to be constructed in such manner that there is a very close sliding fit between the flanges 51, 52 of one fitting 24, and the flanges 32, 33 of the other fitting.

The flanges 32, 33, 51, 52 are preferably provided with a plurality of apertures 55 adapted to receive the pins 56. The apertures 55 are so located in the flanges that the pins 56 are adapted to hold the fittings 24, 25 with the plates 27 and 30 spaced from each other to form a space 22, so that when the expansion joint is installed, it is adapted to permit initial expansion of the concrete sections, or initial contraction.

Each of the pins 56 may be provided with an eye 57 serving as a head, and the lower ends 58 of the pins may be bent over to retain the fittings 24, 25 together as a unit. It will thus be observed that the complete expansion unit is adapted to be handled like a box girder, and it may be installed as a unit and held in place by stakes or any convenient fastening means.

Referring to Fig. 3, it will be observed that certain of the pins 56 may be made long enough to serve as stakes which are driven into the ground to hold the expansion joint unit in place until the concrete has been poured.

The apertures 55 may also be utilized with temporary securing bolts for securing the angle irons together in such manner that a very close sliding fit is effected between the separate fittings 24 and 25. This close sliding fit is considered absolutely essential to prevent relative vertical movement between the sections of concrete 20, 21, and the close sliding fit of these parts also enables one section to assist in the support and reinforcement of the other section, so that an impact on one section is resisted by the other section. If there were any vertical movement permitted between the two sections, the section which was subjected to impact might be broken off at a point spaced from the expansion joint before the second section came to its support, and a very close sliding fit is therefore extremely desirable.

The method of manufacture of the expansion joint unit is therefore preferably carried out as follows. The angle irons 29, 31 are first provided with their anchoring lugs 35 and resilient members 38, 39 are formed on the plates 30. The angle irons are spaced apart a distance which is equal to the thickness of the desired concrete pavement and spot welded to the plates 30 at the points 41, 42 to produce a finished fitting 25.

The angle irons 26, 28 having been previously provided with their anchoring lugs 43, 44, and plate 27 having been provided with securing flanges 45, 46, the parts are then in condition for final assembly. The angle iron 26 is secured to the angle iron 23 by temporary securing bolts which pass through the apertures 55 in the horizontal flanges 32, 51. Angle iron 28 is secured to angle iron 31 in a similar manner.

These angle irons are sufficiently light so that they can be very tightly bolted together, and the angle irons 26, 28 are thus held in the proper position to effect a very close engagement with the angle irons 29, 31. The plate 27 is then located in position and since the attaching flanges 45, 46 extend outward, welds may be made at the points 50 to secure the plate 27 to the angle irons 26, 28 while the parts are in the position of Fig. 1. The parts of the fitting 24 having been welded together, the temporary bolts are removed and replaced by the pins 56 and the expansion joint unit 23 is then in condition for installation in the pavement.

The flanges 32, 33 of the outermost angle irons 29, 31 are preferably provided with beveled or sharpened edges 59 for the purpose of automatically effecting a cleaning of the adjacent outer surfaces of the flanges 51, 52, and to prevent foreign matter from being compressed between the ends of the flanges 32, 33 and the adjacent concrete section 20. Furthermore, if the thickness of the section 20 should happen to be slightly greater than the depth of the fitting 24, the lower beveled edge 59 will automatically break off the excess portion 60 shown in Fig. 1, and the expansion joint will thereafter be adapted to effect a sliding engagement between the fittings without any interference.

The present expansion joint unit is preferably set in place before any concreting is done, the top of the unit being practically flush with the proposed finished surface or slightly below the proposed finished surface, to permit the use of mechanical finishing machines. The concrete that may flow over the flange 51 may easily be removed by a flat tool.

The resilient fingers 38 are sufficiently stiff to prevent the weight of the concrete or the pressure exerted upon it, from causing the expansion joint unit 23 to collapse, but they are not so stiff as to prevent the closing of the expansion joint by the expansion of the concrete after it has set. After the concrete has been poured and finished, the pins or stakes 56 are preferably removed in order that the fittings 24 and 25 may not be caused to shrink away from the concrete sections 20, 21 during the initial drying or setting of the concrete, and the fittings may thus follow the concrete slabs 20, 21 as they shrink in setting. During this period the concrete is weak, and if the two halves of the joint were prevented from separating, the bond of the anchoring lugs would be destroyed and the concrete would shrink away from the metal fittings of the joint on each side.

The depressed space 61 is relatively shallow and narrow, and thus no sensible amount of impact is caused. The amount of space 22 left between the fittings 24, 25 will depend upon the amount of expansion to be taken care of, and the depth of the expansion joint unit, as well as its contour depends upon the cross-sectional shape of the pavement or concrete structure. In actual practice, the depth of the space 61 might be about one-eighth inch deep and one-half inch in width in the initial positon, and one-eighth inch deep by one inch in width when the joint has spread one-half inch from the initial position. A total two-way movement of about one inch is estimated to be enough for about one hundred fifty foot spacing between the joints, but a larger amount of expansion may be permitted by merely increasing the width of the flanges of the angle irons and the width of the space 22.

Figure 5:
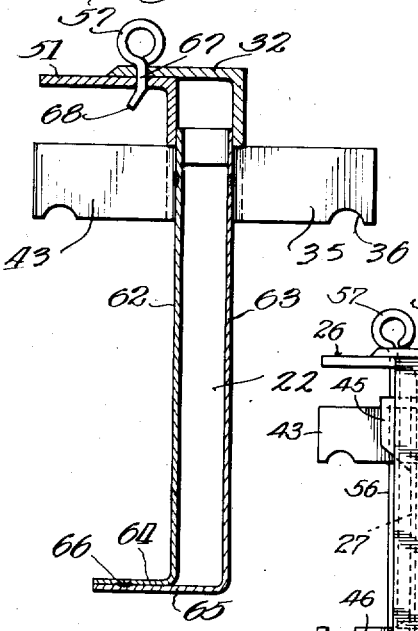
Fig. 5 is a cross-sectional view similar to Fig. 1, of a modified form of expansion joint assembly, apart from the concrete sections.

Referring to Fig. 5, this is a simplified modification which may be constructed more cheaply than the preferred embodiment shown in Figs. 1 to 4, but which does not possess all of the advantages of the preferred expansion joint. In Fig. 5 the metal plates 62, 63 are provided with horizontally extending flanges 64, 65 at the bottom, the flanges being permanently welded together at 66. The angle irons and other structure of the expansion joint unit shown in Fig. 5 at the top may be substantially the same as previously described, the flanges 32, 51 being secured together by relatively short pins 67. The size of th pin 67 is such that the bent end 68 may be straightened by a pull exerted upon the eye 57 so that the pins 67 may be readily removed after the unit has been installed and the concrete poured.

Some pavements are laid on very hard soil, such as compacted gravel which may not require the same precautions with respect to the prevention of relative vertical movements between the sections. There may be little or no tendency in such case for the soil to work up in the joint space from the sub-grade, and therefore the need for permanently closing the bottom of the expansion joint may not be present. In the embodiment of Fig. 5, therefore, the end of the concrete section may separate from the metallic plates 62, 63 when the concrete sections contract, and there may be a relatively loose fit between the flanges 32, 51, because this type of joint is intended to be used where the same precautions are not necessary to prevent relative vertical movement between the concrete sections.

Referring to Fig. 6, this is a modification in which the upper part of the expansion joint unit is substantially the same as that shown in Fig. 5. The metal plates which form the space 22 between the ends of the concrete sections may consist of a unitary U-shaped member formed of a plate of metal bent back upon itself at the point 69 and having a pair of parallel upwardly extending flanges 70, 71. In this embodiment it is desirable to first weld the flange 70 to the angle iron 26 at the top 72, while the flange 71 is welded to the angle iron 29 at the point 73. The U-shaped member 69, 71 is bent apart for this purpose, as shown in Fig. 7, to permit access to both sides of the angle iron and plate during the welding operation. After the angle irons have been secured to the U-shaped member, as shown in Fig. 7, the U-shaped member is bent together to the position of Fig. 6, and secured in place by pins 67.

Figure 8:
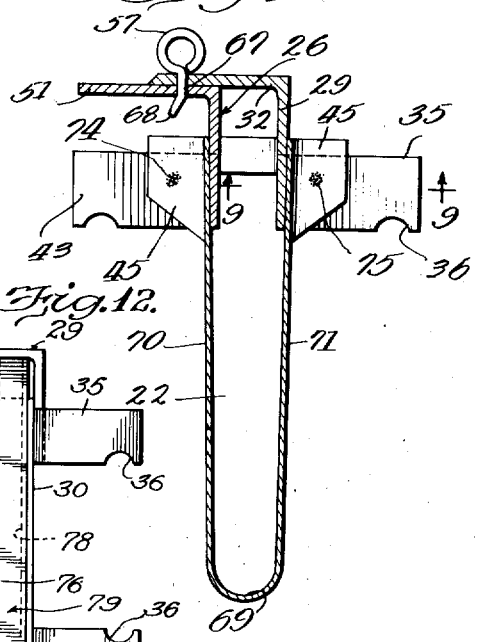
Fig. 8 is a similar view of another modification of an expansion joint unit.

Referring to Fig. 8, this is another modification in which the lower part of the expansion joint unit is provided with a U-shaped member similar to that described with respect to Fig. 6. The U-shaped member of Fig. 8, however, is provided with outwardly projecting attaching flanges 45 on both sides for the purpose of registering with the anchoring lugs 43, 35, and permitting the attachment of the U-shaped plate 70, 71 while the parts are in the position of Fig. 8. In this embodiment the angle irons may be secured together by the pins 67 or by temporary securing bolts, and the welding at the points 74, 75 may be accomplished from the outside.

Figure 9:
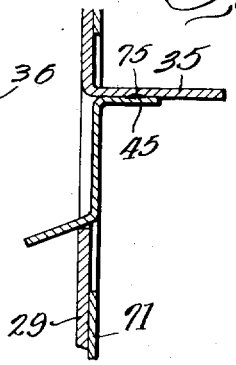
Fig. 9 is a fragmentary, cross-sectional view, taken on the plane of the line 9—9 of Fig. 8.

As shown in Fig. 9, the apertures which are formed in the plates 70, 71, and in the angle irons 26, 29 are so located with respect to each other that the apertures in the angle are closed by the plate, and those in the plate are closed by the angle iron.

Figure 10:
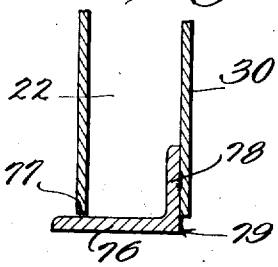
Fig. 10 is a fragmentary, cross-sectional view on a horizontal plane at one end of an expansion joint unit, showing the mode of closing the ends of the unit.

Referring to Fig. 10, this is a fragmentary, sectional view, showing one end of the expansion joint unit. Each end of the unit is preferably provided with one or more vertically extending angle irons having laterally projecting flanges 76 for effecting a sliding engagement with the adjacent edge 77 of the plate. The other flange 78 of the angle iron 79 is spot welded or otherwise secured to the plate 30 in such manner as to provide a closure for the ends of the space 22.

The angle iron 79 may be very light, as it carries no stress and no corresponding angle iron is required on the other plate for the same reason.

Figure 11:
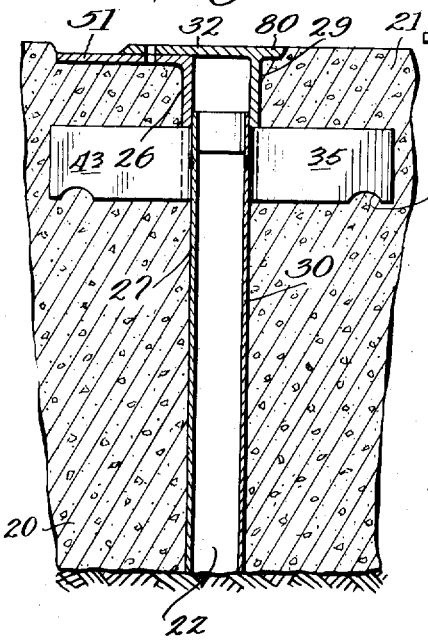
Fig. 11 is a similar view of another modification.

Referring to Fig. 11, this is a modification embodying an additional feature which it may be found desirable to include in any of the modifications previously disclosed. The expansion joint unit of Fig. 11 includes a pair of vertically extending plates 27, 30 welded to the vertically extending flanges, 26, 29, of angle irons, which are provided with horizontally extending flanges 32, 51.

The angle iron 32 is provided with a rearwardly projecting ledge or projection 80, which is designed to overlap the concrete of the section 21 and prevent the soil from getting between the concrete and the vertical flange of the angle iron 29 in case the concrete shrinks away from the angle iron slightly.

Figure 12:
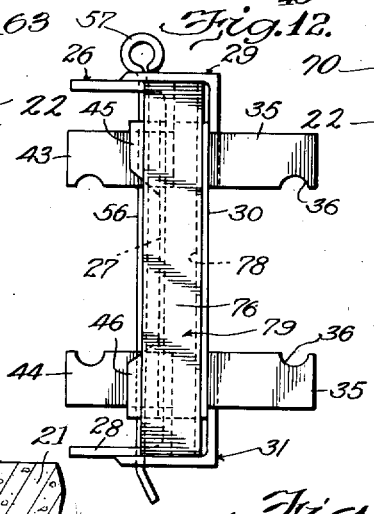
Fig. 12 is an end elevational view of a joint of the type of Fig. 1, provided with a closure of the type of Fig. 10.

Referring to Fig. 12, this is an end view of the enclosure for an expansion joint unit constructed according to the fragmentary showing of Fig. 10. It will be noted that the end flange 76 is part of the angle 79, which has its other flange 78 secured to the side wall 30. The end flange 76 slidably engages the flanges 26, 28 and 27, and is located inside of the flanges of the angles 29 and 31. Therefore, the end is completely closed by a sliding construction in a manner which assures that no foreign matter shall get into the air space 22.

It should be understood that all of the advantageous features described herein need not be employed in every embodiment of the invention, but any of the features described in the various modifications may be employed in any other modification that is adapted to the use of such a feature.

It will thus be observed that the present invention is capable of being embodied in a number of more simple forms of construction, and while these simpler forms of construction do not have all of the advantages of the preferred form of embodiment, they are capable of performing new and useful results and do not require the use of any semi-plastic filler.

It will thus be observed that in the expansion joint proposed it is not necessary to use any plastic or so-called compressible filler. The joint may either widen or close a substantial predetermined amount without exposing any opening into which soil or other foreign material may enter to prevent the future functioning of the joint.

The overlapping, sliding steel members which prevent the entry of soil are so tightly fitted together in construction, and are designed of such strength that no relative vertical movement can take place between the adjacent slabs. A vertical force exerted upon one slab is immediately transmitted to the adjacent slab, and thus both concrete sections serve immediately to support a load that may come upon one slab only. The elimination of the causes of impact at the joints, and the provision for material support by the adjacent sections effects an economy in the design of the whole pavement, since it is not necessary to make the slabs as thick as would otherwise be necessary.

The present expansion joint permits the use of standard structural shapes and plates or members which are made entirely of sheet metal. The complete expansion joint unit is capable of being constructed as a unit in the factory and capable of being handled or shipped in a single piece like a box girder. The troubles which are caused by the use of semi-plastic fillers for expansion joints are entirely eliminated by the present expansion joint, and the present device is capable of giving long service under the most adverse conditions without necessity for repair or attention of any kind.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. In a concrete pavement or the like, the combination of a pair of concrete sections having their adjacent edges initially spaced from each other, with a metal fitting carried by the first concrete section and having metallic guide surfaces above and below said concrete section, and a second metal fitting carried by the other of said sections and having guide flanges located above and below the guide surfaces of the first mentioned section, whereby said concrete sections are slidably mounted with respect to each other to permit expansion and contraction of the concrete and to transmit load from one section directly to the other, said fittings being provided with registering apertures adapted to receive a supporting pin for the purpose of holding the parts of said fittings in predetermined position during the handling and installation of said fittings.

2. In a concrete pavement or the like, the combination of a pair of concrete sections having their adjacent edges initially spaced from each other, with a metal fitting carried by the first concrete section and having metallic guide surfaces above and below said concrete section, and a second metal fitting carried by the other of said sections and having guide flanges located above and below the guide surfaces of the first mentioned section, whereby said concrete sections are slidably mounted with respect to each other to permit expansion and contraction of the concrete and to transmit load from one section directly to the other, said fittings being provided with registering apertures adapted to receive a supporting stake which may be driven therethrough into the subgrade for the purpose of supporting said fittings in predetermined position during the placing of the concrete.

3. An expansion joint unit comprising an inner fitting having a pair of horizontally extending guide flanges and having anchoring lugs adapted to extend into the body of the concrete, an outer fitting having a pair of horizontally extending guide flanges located to engage closely the guide flanges of the inner fitting, and outwardly projecting anchoring lugs carried by said outer fitting, adapted to extend into the body of the concrete, said guide flanges being provided with registering apertures and pins connecting the inner and outer fittings together to form a unit.

4. An expansion joint unit comprising an inner fitting having an upper angle iron and a lower angle iron with two flanges of said angle irons disposed substantially parallel to each other, and the other flanges extending toward each other, inwardly projecting anchoring lugs struck out of the body of said angle irons for engagement in a body of concrete, and a plate joining the second mentioned flanges of said angle irons, said plate having inwardly projecting lugs fixedly secured to said anchoring lugs.

5. An expansion joint unit comprising an inner fitting having an upper angle iron and a lower angle iron with two flanges of said angle irons disposed substantially parallel to each other, and the other flanges extending toward each other, inwardly projecting anchoring lugs struck out of the body of said angle irons for engagement in a body of concrete, and a plate joining the second mentioned flanges of said angle irons, said plate having inwardly projecting lugs fixedly secured to said anchoring lugs, said anchoring lugs and said plate lugs being located so that the apertures in the body of said angle iron will be closed by said plate, and the apertures in said plate will be closed by said angle iron.

6. An expansion joint unit comprising an inner fitting having an upper angle iron and a lower angle iron with two flanges of said angle irons disposed substantially parallel to each other, and the other flanges extending toward each other, inwardly projecting anchoring lugs struck out of the body of said angle irons for engagement in a body of concrete, a plate joining the second mentioned flanges of said angle irons, said plate having inwardly projecting lugs fixedly secured to said anchoring lugs, and an outer fitting comprising a pair of angle irons arranged for close sliding engagement with said first mentioned angle iron, and a metal plate joining said latter angle irons to form a chamber of variable width between said fittings.

7. An expansion joint comprising an inner fitting having a pair of horizontally extending guide flanges and having anchoring lugs adapted to extend into the body of the concrete, an outer fitting having a pair of horizontally extending guide flanges located to engage closely and slidably the guide flanges of the inner fitting, and outwardly extending anchoring lugs carried by said outer fitting adapted to extend into the body of the concrete, said guide flanges being provided with removable means adapted to secure said inner and outer fittings together with the guide flanges in engagement with each other in position for movement with the sections of concrete after said removable means is removed, said removable means combining the fittings to form a single unit for installation.

8. An expansion joint unit comprising an inner fitting having an upper angle iron and a lower angle iron with two flanges of said angle irons disposed substantially parallel to each other, and the other flanges extending toward each other, inwardly projecting anchoring lugs struck out of the body of said angle irons for engagement in a body of concrete, and a plate joining the second mentioned flanges of said angle irons, said plate having inwardly projecting lugs fixedly secured to said anchoring lugs, the parallel flanges of said angle irons being provided with registering apertures and pins for passing through said apertures to secure said inner fitting to an outer fitting to form a unit.

9. An expansion joint unit comprising an inner fitting having an upper angle iron and a lower angle iron with two flanges of said angle irons disposed substantially parallel to each other, and the other flanges extending toward each other, inwardly projecting anchoring lugs struck out of the body of said angle irons for engagement in a body of concrete, and a plate joining the second mentioned flanges of said angle irons, said plate having inwardly projecting lugs fixedly secured to said anchoring lugs, said anchoring lugs and said plate lugs being located so that the apertures in the body of said angle iron will be closed by said plate, and the apertures in said plate will be closed by said angle iron, the parallel flanges of said angle irons being provided with registering apertures and pins for passing through said apertures to secure said inner fitting to an outer fitting to form a unit.

10. In an expansion joint unit, a longitudinally elongated hollow box-like structure comprising a pair of telescopically connected companion sections and means for anchoring said sections to respective portions of the road, one of said sections being provided at its outer end with means for attachment of an end closure, said end closure comprising a metallic member for slidably engaging the parts of the other section to close the end of said box-like structure.

11. In an expansion joint unit, a longitudinally elongated hollow box-like structure comprising a pair of telescopically connected companion sections and means for anchoring said sections to respective portions of the road, one of said sections being provided at its outer end with means for attachment of an end closure, said end closure comprising a metallic member for slidably engaging the parts of the other section to close the end of said box-like structure, said metal member comprising an angle iron having one flange secured by said means to one section and having the other flange extending transversely to said sections.

12. In a concrete expansion joint, the combination of four metal members, each having horizontally extending flanges each having vertical flanges and each having anchoring lugs adapted to be embedded in an adjacent section of concrete, pairs of said vertical flanges being secured vertically extending plates to form an expansible box, means for temporarily securing said horizontal flanges to each other in one of the positions which they will assume in the sliding movement of said horizontal flanges relative to each other after installation, and means engaging the innermost of said horizontal flanges and urging said innermost horizontal flanges into close contact with the outermost of said horizontal flanges, whereby all play is taken up between said respective flanges during the installation of the unit in the concrete, to assure a close sliding fit between the parts of the joint after installation.

13. In a joint for concrete structures, the combination of a pair of adjacent sections of concrete, said sections having a crack formed between them at their juncture, with a load transmitting member having a flange extending in the general direction of the crack between the sections and located substantially at said crack, said load transmitting member having integral anchoring lugs formed out of said flange and having a load transmitting flange extending substantially parallel to a surface on the opposite concrete section, said latter flange being located in sliding engagement with said surface on the opposite concrete section, and the anchoring lugs extending oppositely from said first flange and being fixedly embedded in the other concrete section, whereby loads on the one concrete section are transmitted through the said flange and load transmitting member to the other concrete section, to maintain alignment of said sections, and metallic facing fixedly secured to said opposite concrete section and covering said surface which is engaged by said load transmitting flange, whereby the sliding engagement takes place between two metal surfaces, and means for assuring a close sliding contact between said metallic facing and said horizontal flange after installation, comprising securing means for temporarily securing said horizontal flange and metallic facings together.

CLIFFORD OLDER.